March 11, 1969  S. G. INJESKI  3,431,966
FRICTION-HELD REMOVABLE GATE
Filed May 19, 1967
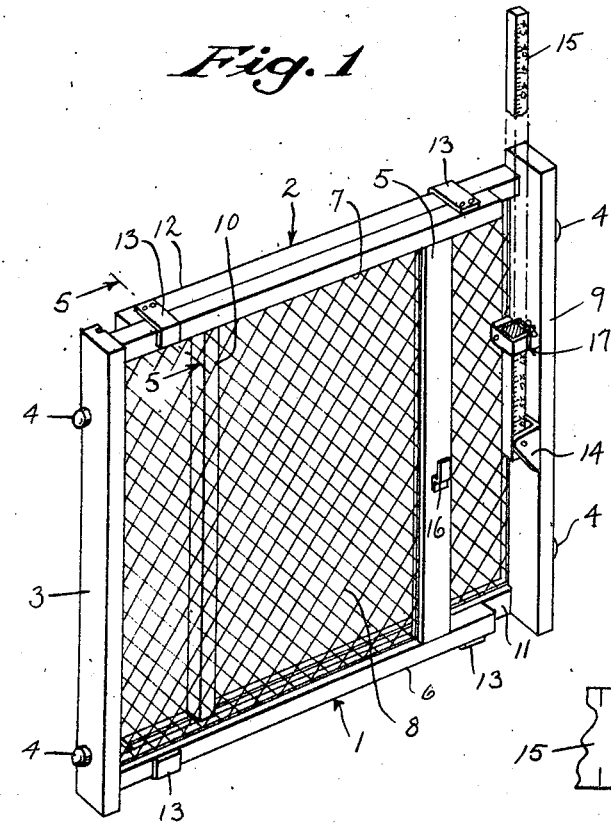
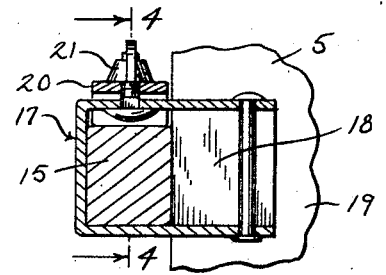
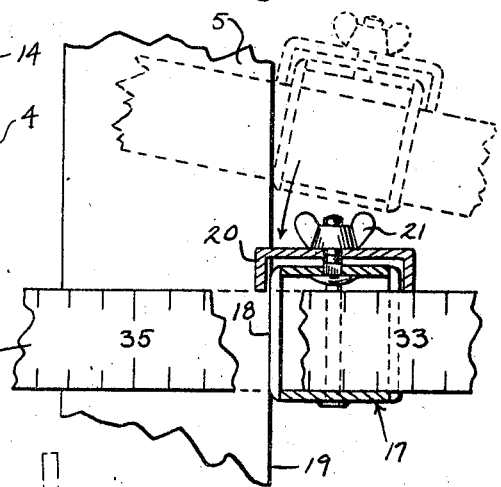
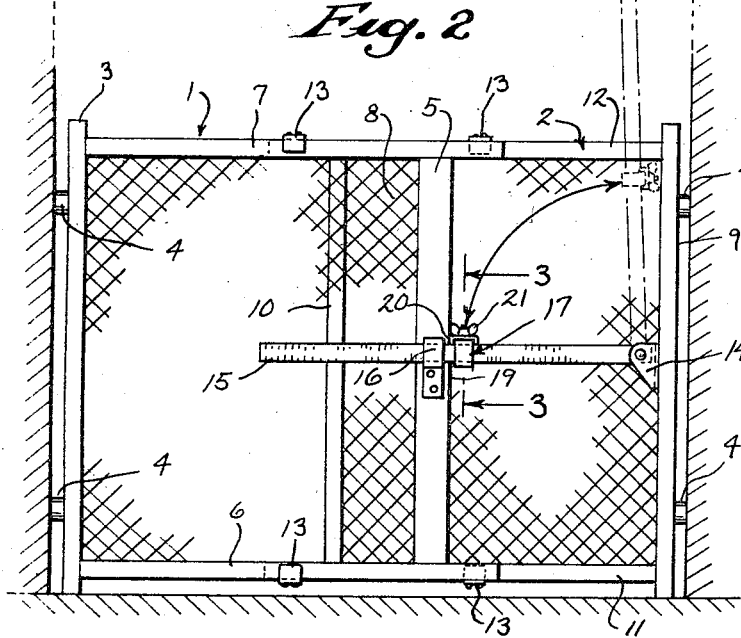
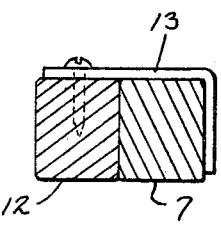
INVENTOR
STANLEY G. INJESKI
BY Arthur H. Seidel
ATTORNEY 3,431,966
FRICTION-HELD REMOVABLE GATE
Stanley G. Injeski, Milwaukee, Wis., assignor to Worldsbest Industries, Inc., Cudahy, Wis., a corporation of Wisconsin
Filed May 19, 1967, Ser. No. 639,887
U.S. Cl. 160—225       2 Claims
Int. Cl. E06b 9/02, 3/92

ABSTRACT OF THE DISCLOSURE

A portable gate is shown for insertion between the jambs of a door or between posts such as at the head of stairway that comprises two rectangular frames slidably secured to one another for adjustment of the horizontal length of the gate with a pivoted bar on one frame that can be moved toward a horizontal position in which a cam carried by the bar strikes an upright portion of the other frame to force the frames apart whereby the gate may be wedged tightly in position.

Background of invention

The invention lies in the field of safety gates for preventing small children and pets from leaving an enclosed area which would have an open entryway were the gate not placed in position. Most safety gates are permanently mounted in position by screws or the like and are comprised of lazy tongs that may be extended across a doorway or the head of a stairway, or retracted from such extended position to open the doorway or give access to the stairway. Such safety gates are unsightly and cannot be readily removed when their presence is not required. They also obstruct a portion of the dorway or access to a stairway, so that they are a hindrance when not in use.

Some gates have been made portable, such as that shown in Patent No. 2,859,811. Again, however, in such patent the gate consists of a lazy tongs which does not provide a strong, rugged construction. It is possible to bend and deform a lazy tongs, or to rattle the same, so that a child can make a nusiance by rattling the gate and can aslo be destructive of the device.

A lazy tong construction inherently presents large openings when a gate is in extended position. Hence, a child on one side of the gate can work its hands through the gate and at times release the structure holding the gate in its tight position between the jambs of a door or between posts at the head of a stairway. It would therefore be desirable to have a portable gate which does not present such large openings when in an extended position.

Summary of the invention

The present invention provides a removable gate having a pair of rectangular frames that are slidably joined with one another and that have a mesh or screen stretched across the members of each frame to present small openings at all times, and one of the frames carries a pivoted bar that may be swung toward a horizontal position in which a cam carried on the bar strikes the opposite frame to spread the frames apart and hold them tightly between opposed jambs of a door, or posts or the like.

A gate comprised of a pair of rectangular frames as provided in the present invention is sturdy and strong and may withstand considerable abuse. Hence, the gate of the invention can be used to confine larger pets and children more advanced in size than gates of lesser strength.

It is a particular object of the invention to provide a spreading force for the two frames of a gate through the use of a single pivoted bar which need extend only across a portion of the gate. Such bar can be sturdily mounted and the transmission of spreading forces need only be over short distances.

It is a further object of the invention to apply a spreading force between two frames of a gate by a cam action. A closing force applied by a person is then multiplied through the cam action so as to produce substantial wedging forces which will positively hold the gate in place.

The foregoing objects and other objects and advantages of the invention will become apparent from the description to follow in which there is shown by way of illustration and not of limitation a preferred embodiment of the invention.

The drawing

FIG. 1 is a view in perspective of a removable gate embodying the invention,

FIG. 2 is a view in elevation of the gate of FIG. 1 shown in position between the jambs of a doorway, FIG. 3 is a fragmentary view of a part of the gate shown in FIGS. 1 and 2 which is taken through the plane 3—3 designated in FIG. 2, FIG. 4 is a fragmentary view taken on the plane 4—4 designated in FIG. 3, and FIG. 5 is a fragmentary view in cross section of a part of gate taken on the plane 5—5 designated in FIG. 1.

Description of a preferred embodiment

Referring now to the drawing, FIG. 1 shows a gate of the invention which has a front rectangular frame 1 and a rear rectangular frame 2. The front rectangular frame 1 has a left hand stile 3 that has a bottom end that will rest upon a floor and which carries a pair of cushions 4 for engagement with a door jamb, post or the like. The rectangular frame also has a right hand inner stile 5, and between the stiles 3 and 5 is a horizontal bottom runner 6 and a horizontal upper runner 7. The area bounded by the stiles 3, 5 and the runners 6, 7 is covered with an open mesh fabric 8 that may be of any suitable material such as a woven wire fabric or an apertured sheet of synthetic fabric, which can be stretched tightly and held in the members comprising the frame 1.

The rear rectangular frame 2 has a right hand stile 9 that may rest on a floor with a second pair of cushions 4 for engagement with a door jamb, post or the like. The opposite, or left hand side of the frame 2 has an inner stile 10, and between the upright stiles 9 and 10 is a bottom runner 11 and an upper runner 12.

The two frames 1 and 2 are secured to one another by a set of four guide brackets 13, two of which are along the bottom of the gate and the other two of which are at the top of the gate. Each guide bracket 13 is secured to one of the runners, as particularly shown in FIG. 5, and it extends across the associated runner and down the outside of the runner, as also illustrated in FIG. 5. The brackets 13 restrain the frames 1 and 2 so that they cannot move apart in a direction normal to the areas bounded by the frames, but the brackets 13 do provide for sliding movement of the frames 1 and 2 with respect to one another in a horizontal direction, whereby the horizontal length of the gate may be adjusted.

Mounted on the inner face of the stile 9 is a bracket 14 to which is pivoted one end of a spreader bar 15. The bar 15 is shown in a raised, retracted position in FIG. 1, and it is shown in a lowered, horizontal operating or spreading position in FIG. 2. When the bar 15 is in the lower position of FIG. 2 it will rest in a catch 16 that is mounted on the inner stile 5 of the front frame 1. The catch 16 limits the descent of the bar 15, and also holds the bar 15 from swaying in a horizontal direction.

Mounted upon the pivoted spreader bar 15 is a slide 17. As particularly shown in FIG. 3, the slide 17 encircles the bar 15 with a vertical side portion and horizontal upper and lower portions. The slide 17 may be moved along the bar 15 for purposes of adjustment, and it includes a cam portion 18 that is clearly shown in FIGS. 3 and 4. The cam portion 18 is aligned in the same vertical plane with the inner stile 5 so that the side face 19 of the stile 5 may be struck by the cam portion 18 when the pivoted bar 15 is lowered.

The slide 17 may be locked in its position along the pivoted bar 15 by means of a clamp 20 which is tightened by a wing nut 21. Thus, when the bar 15 is lowered, and with the slide 17 tightly secured in a preselected position on the bar 15, the cam portion 18 will move downwardly and inwardly toward the side face 19 of the inner stile 5, so as to engage the face 19. Upon engaging the face 19, the cam portion 18 will function to move the stile 5, and hence the entire front rectangular frame 1, toward the left, as viewed in FIGS. 1 and 2. This will produce a spreading force between the frames 1 and 2 whereby the outer stiles 3 and 9 are moved apart. In this manner, the spreading force may tightly secure the gate between a pair of door jambs, such as illustrated in FIG. 2. The cushions 4 may compress sufficiently to tightly hold the gate in place, and to accommodate for the camming action of the cam portion 18 of the slide 17 as it works against the side face 19 of the inner stile 5.

As shown in FIGS. 1 and 2, the pivoted bar 15 carries markings, or calibrations, which indicate the width of a door, or the distance between posts between which the gate is to be secured. By loosening the wing nut 21 of the clamp 20 the slide 17 is moved along the pivoted bar 15 to match the distance between the door jambs, or posts. Then, the clamp 20 is tightened and when the bar 15 is lowered the jamming force applied through the cam portion 18 will be the correct amount for holding the gate tightly in place. Whenever it is desired to remove the gate the pivoted bar 15 may easily be raised, the gate is then shortened horizontally and removed.

The invention provides a sturdy gate of strong construction which can easily be placed in position and which only has one pivoted part for developing jamming forces. The closing force applied to the bar 15 is multiplied, so that only gentle forces need be exerted in the use of the gate. Further, the gate provides fixed rectangular frames which are covered by a satisfactory mesh that has small openings at all times. Thus, children cannot extend their arms through the gate, or operate parts of the gate on the side opposite the enclosure in which they are confined.

I claim:
1. In a removable gate for positioning between upright members the combination comprising:
 a first frame having an outer stile for engagement with a vertical surface and an inner stile;
 a second frame having an outer stile for engagement with a vertical surface opposite a vertical surface engageable by the outer stile of the first frame;
 a sliding engagement between said frames whereby they may be moved to alter the horizontal length of the gate;
 an elongate member on the outer stile of said second frame which can be moved toward and from the horizontal, such that when removed from the horizontal there is no connection with the first frame;
 a catch on the inner stile of said first frame adapted to receive and limit the descent of said elonagte member;
 a cam member on said elongate member which engages the inner stile of said first frame upon descending movement of said elongate member to exert a force between said inner stile and said second frame, said force being a spreading force urging the rectangular frames away from one another to extend the horizontal length of said gate.

2. A gate in accordance with claim 1 in which said elongate member comprises a lengthwise bar pivoted to said second frame and said cam member is a part of a slide movable along the bar, said slide including a clamp for fixing the slide and cam member thereof with respect to the bar to thereby regulate the degree of extension of the gate.

References Cited

UNITED STATES PATENTS

| | | | |
|---|---|---|---|
| 1,335,583 | 3/1920 | Karro | 160—225 |
| 1,683,204 | 9/1928 | Mills | 160—224 |
| 2,631,056 | 3/1953 | Smith | 160—224 |
| 2,859,811 | 11/1958 | Rusch | 160—136 |

PETER M. CAUN, *Primary Examiner.*